United States Patent [19]

Higo

[11] B 3,997,744

[45] Dec. 14, 1976

[54] LIQUID LEVEL DETECTOR

[75] Inventor: Nobumasa Higo, Toyota, Japan

[73] Assignees: Nippondenso Co., Ltd., Kariya; Toyota Jidosha Kogyo Kabushiki Kaisha, Toyota, both of Japan

[22] Filed: Mar. 21, 1974

[21] Appl. No.: 453,533

[44] Published under the second Trial Voluntary Protest Program on February 17, 1976 as document No. B 453,533.

[30] Foreign Application Priority Data

Mar. 31, 1973  Japan .................. 48-39476[U]

[52] U.S. Cl. ............................................. 200/84 C
[51] Int. Cl.$^2$ ...................................... H01H 35/18
[58] Field of Search ............. 200/84 C; 340/244 A, 340/59

[56] References Cited

UNITED STATES PATENTS

| | | | |
|---|---|---|---|
| 2,927,176 | 3/1960 | Auld, Jr. et al. | 200/84 C |
| 3,258,968 | 7/1966 | Woodcock | 200/84 C |
| 3,750,124 | 7/1973 | Barnes et al. | 200/84 C |

Primary Examiner—David Smith, Jr.
Attorney, Agent, or Firm—Cushman, Darby & Cushman

[57] ABSTRACT

Liquid level detectors known in the art are, for the most part, designed so that they are mounted in a vertical direction to the liquid level. However, with the recent trend toward using liquid containers of more complicated shapes, there has existed a need for a liquid level detector of a type that can be mounted in a horizontal direction with respect to the liquid level. Moreover, there has existed a need for a liquid level detector of a type which requires as small a mounting opening as possible. In accordance with the present invention, there is provided a liquid level detector in which a permanent magnet is fixedly mounted on the central portion of a float having a long and slender shape, e.g., elliptic or rectangular shape and being enabled to slide along a case containing a reed switch therein and to positively bring the reed switch into operation to detect the liquid level, and which thus meets the above-mentioned requirements.

6 Claims, 2 Drawing Figures

F I G. 1
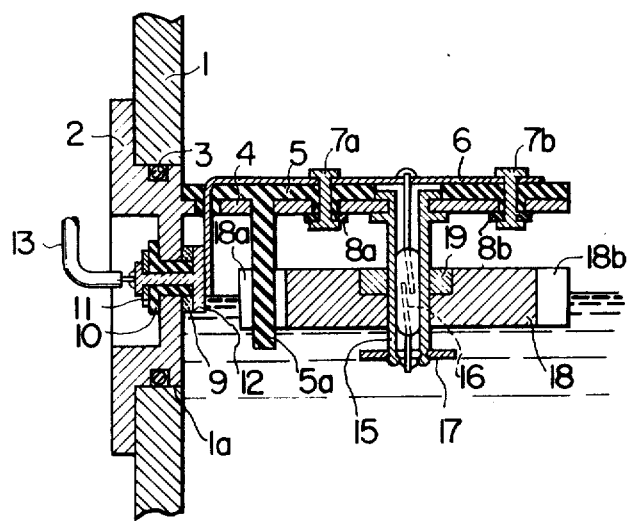
F I G. 2
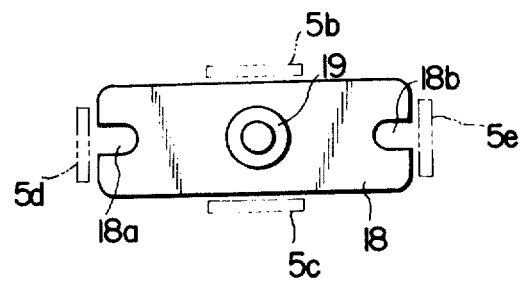

LIQUID LEVEL DETECTOR

The present invention relates to a liquid level detector mainly used in automotive vehicles.

The conventional liquid level detectors are designed so that they are mounted in a direction vertical to the liquid level. However, since liquid containers of more and more complicated shapes have come into use, there has existed a need for a liquid level detector of a type that can be mounted in a horizontal direction with respect to the liquid level. There has also existed need for a liquid level detector of a type that requires as small a mounting opening as possible.

It is therefore an object of the present invention to provide a liquid level detector which can be horizontally mounted in a small opening on a liquid container and which is of as simple shape as possible for easy manufacture thereof.

In accordance with the present invention, there is thus provided a liquid level detector wherein a float of a long and slender shape, e.g., elliptic or rectangular shape is used to ensure an improved buoyancy and easy horizontal mounting of the detector in a small opening on a liquid container. The float is also provided with a permanent magnet fixedly mounted at the central portion thereof, and the permanent magnet is moved along the same axis as a reed switch and a case having the reed switch mounted therein to positively bring the reed switch into operation to detect the liquid level.

A remarkable advantage of the device of this invention is that the float is provided with a sufficient buoyancy and therefore the reed switch is positively operated to detect the liquid level.

The above and other objects, features and advantages of the present invention will become readily apparent from the following detailed description taken in conjunction with the accompanying drawings, in which:

FIG. 1 is a longitudinal cross-sectional view showing an embodiment of a liquid level detector according to the present invention; and FIG. 2 is a plan view of the float used in the embodiment shown in FIG. 1.

The present invention will now be described in greater detail with reference to the illustrated embodiment.

Referring to FIGS. 1 and 2, numeral 1 designates a container, e.g., the oil pan of an automobile, 2 the body portion of a liquid level detector which is made from a conductor such as aluminum and is fitted in a mounting opening 1a formed on one side of the container 1. Numeral 3 designates an O-ring for providing a seal between the container 1 and the body portion 2, 4 a supporting plate integrally secured to the body portion 2 to extend in a horizontal direction, 5 an insulating board having a turning-preventive member 5a integral therewith, 6 an electric connecting plate made from a material such as brass. The electric connecting plate 6 and the insulating board 5 are attached to the supporting plate 4 by rivets 7a and 7b through insulating washers 8a and 8b. One end of the electric connecting plate 6 is connected by soldering, for example, to an external terminal 12 connected to the body portion 2 through a sealing packing 9, an insulating bush 10 and a washer 11. Numeral 13 designates a lead wire connected to a load, 15 a cylindrical case made from a conductive non-magnetic material, e.g., brass and vertically fixed on the supporting plate 4, 16 a reed switch housed in the case 15 and having its one end connected by soldering to the electric connecting plate 6 and the other end soldered to a stopper 17 consisting of a conductor. The reed switch 16 is grounded through the stopper 17, the case 15, the supporting plate 4 and the body portion 2. The stopper 17 is secured to the case 15 by soldering or calking, for example. Numeral 18 designates a rectangular float provided with notches 18a and 18b at the longitudinal ends thereof. The turning-preventive member 5a is loosely fitted in the notch 18a to prevent the turning motion of the float 18. Numeral 19 designates a ring-shaped permanent magnet fixedly mounted by adhesion at the central portion of the float 18.

With the construction described above, the liquid level detector according to this embodiment operates as follows. In response to the up and down of the float 18 in accordance with the increase and decrease of the liquid in the container 1, the position of the permanent magnet 19 relative to the reed switch 16 changes and thus the reed switch 16 is turned on and off to detect the liquid level.

Further, since the float 18 is formed into a rectangular shape, the liquid level detector can be inserted into the container 1 through the small mounting opening 1a formed on the side of the container 1. On the other hand, when the liquid level detector is to be removed from the container 1, it can be easily removed through the small mounting opening 1a by virtue of the fact that the float 18 is prevented from turning relative to the supporting plate 4 by the turning-preventive member 5a and the notch 18a. Thus the liquid level detector excels in exchangeability.

While, in the above-described embodiment, the rectangular float 18 is used, a float having, for example, a long and slender elliptic shape may be used as well.

Further, while, in the embodiment described above, the turning-preventive member 5a is loosely fitted in the notch 18a formed on the longitudinal end of the float 18 so as to prevent the turning of the float 18 relative to the supporting plate 4, an additional turning-preventive member may be loosely fitted in the notch 18b. Moreover, through holes may be provided in place of the notches 18a and 18b to loosely fit the associated turning-preventive members therein, or alternately, as shown by the dot-and-dash lines in FIG. 2, a pair of turning-preventive members 5b and 5c or 5d and 5e may be arranged along the sides or the longitudinal ends of the float 18, thereby preventing the turning of the float 18 relative to the supporting plate 4. Furthermore, the turning-preventive member 5a may be eliminated, if the liquid level detector is placed in and removed from the container 1 while holding the float 18 with the hand.

It will thus be seen from the foregoing description that in the illustrative embodiment described hereinabove the liquid level detector of this invention comprises the body portion 2 fitted in the mounting opening 1a formed on the side of the container 1, the supporting plate 4 mounted on the body portion 2 to extend in a horizontal direction, the case 15 vertically secured to the supporting plate 4, the reed switch 16 housed in the case 15, the float 18 of horizontally long and slender shape adapted to move coaxially along the outer side of the case 15 and the reed switch 16, and the permanent magnet 19 fixedly mounted on the float 18 to be positioned around the reed switch 16 and the case 15. Thus, a remarkable advantage of the detector of this invention is that by inserting the float 18 of horizontally long and slender shape in a longitudinal direction through the mounting opening 1a formed on the side of the container 1, only with the provision of the small mounting opening 1a on the side of the container 1 the float 18 can be inserted into the container 1 to horizontally mount the liquid level detector with respect to the container 1. Another remarkable advantage of the detector of this invention is that it is possible to lengthen the longitudinal dimension of the float 18 to provide it with a sufficient buoyancy and thereby to positively bring the reed switch 16 into operation to detect the liquid level by virtue of the fact that the float 18 is of long and slender shape.

What I claim is:

1. A liquid level detector for detecting the level of a liquid in a container comprising:
   - a body portion fitted in a mounting opening formed on one side of a container;
   - a supporting plate attached to and extending from said body inside said container in a horizontal direction;
   - a reed switch;
   - a case for housing said reed switch therein, said case being vertically secured to said supporting plate and said reed switch being vertically positioned;
   - a float formed as a horizontally long and slender shape with a length substantially greater than its width, and guided by said case to slide up and down in accordance with the change of the level of said liquid;
   - a turning-preventive member engaging said float to prevent turning thereof so that the longitudinal dimension of said float is oriented toward said mounting opening;
   - a permanent magnet mounted on the inside of said float to open and close said reed switch in accordance with the change of the level of said liquid;
   - a stopper for sealing said float in said case;
   - an electric connecting plate connected to said reed switch, and
   - an insulating board for electrically insulating said electric connecting plate from said supporting plate, said insulating board formed integral with said turning-preventive member.

2. A liquid level detector according to claim 1, wherein said float is provided with a notch, and said turning-preventive member is fitted in said notch to prevent the turning motion of said float.

3. A liquid level detector for detecting the level of a liquid in a container comprising:
   - an electrically conductive body portion fitted in a mounting opening formed on one side of a container;
   - an electrically conductive supporting plate attached to and extending from said body inside said container in a horizontal direction;
   - a reed switch;
   - an electrically conductive case for housing said reed switch therein, said case being vertically secured to said supporting plate and said reed switch being vertically positioned;
   - a float formed as a horizontally long and slender shape with a length substantially greater than its width, and guided by said case to slide up and down in accordance with the change of the level of said liquid;
   - an external terminal connected to a load; one end of said reed switch being electrically connected to said stopper to be grounded through said stopper, said case, said supporting plate and said body portion, and the other end of said reed switch being electrically connected to said external terminal;
   - an insulating board; and
   - an electric connecting plate fixedly mounted on said supporting plate and electrically insulated therefrom by said insulating board, said electric connecting plate being connected to said other end of said reed switch to electrically connect said reed switch to said external terminal.

4. A liquid level detector according to claim 3, further comprising an O-ring for sealing said mounting opening formed on said container.

5. A liquid level detector according to claim 3, wherein said container is an oil pan.

6. A liquid level detector according to claim 3, wherein said liquid is engine oil.

* * * * *